United States Patent [19]

Gough

[11] Patent Number: 4,825,998
[45] Date of Patent: May 2, 1989

[54] APPARATUS FOR EMPTYING A CONVEYOR BUCKET

[75] Inventor: George T. Gough, Charlotte, N.C.

[73] Assignee: Gouch Holdings (Engineering) Limited, United Kingdom

[21] Appl. No.: 60,455

[22] Filed: Jun. 11, 1987

[51] Int. Cl.[4] .............................................. B65G 47/40
[52] U.S. Cl. .................................. 198/706; 198/703; 198/712
[58] Field of Search ............... 198/703, 706, 710, 711, 198/712, 713, 714, 476.1, 802, 415, 416

[56] References Cited

U.S. PATENT DOCUMENTS 2,323,920  7/1943  Knudsen ..................... 198/706 X
3,486,605 12/1969  Gough ............................ 198/706
3,857,477 12/1974  Chipchase ...................... 198/802

FOREIGN PATENT DOCUMENTS 3521704  1/1987  Fed. Rep. of Germany ...... 198/706

Primary Examiner—Robert J. Spar
Assistant Examiner—Lyle Kimms
Attorney, Agent, or Firm—W. Thad Adams, III

[57] ABSTRACT

An apparatus for tipping about a horizontal axis a bucket carried by a conveyor chain around a circuit to fill the bucket with contents at a predetermined location and empty the contents thereof at a predetermined location. The apparatus comprises a bucket pulley mounted for rotation with the bucket on one end thereof concentric with the horizontal axis about which the bucket is tipped, and an elongate bucket pulley-engaging device positioned adjacent said chain at a predetermined point on the circuit where the contents of the bucket are to be emptied. The bucket pulley-engaging device has a length at least as long as the circumference of the bucket pulley and frictionally engagable with the circumference of the bucket pulley to rotate the bucket pulley and thereby rotate and invert the bucket mounted thereon as the chain moves the bucket along the length of the bucket pulley-engaging device.

4 Claims, 9 Drawing Sheets

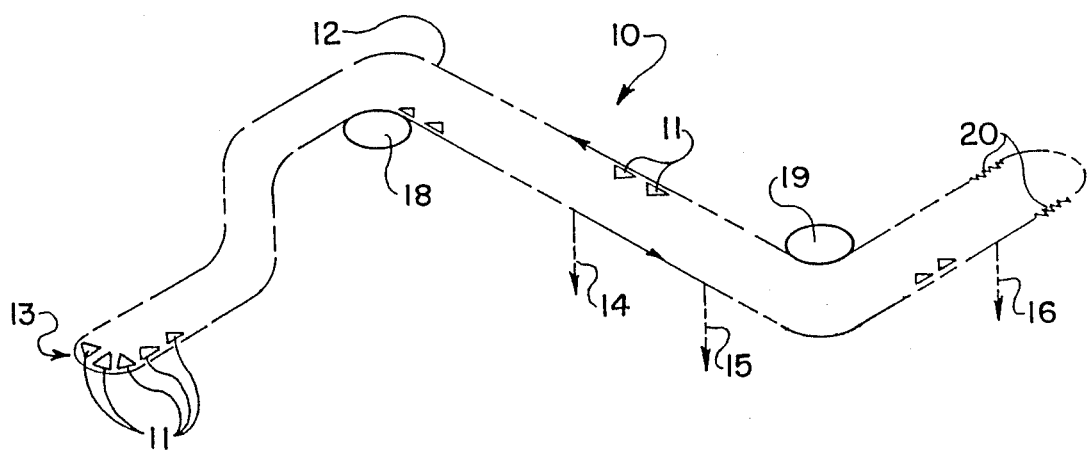
FIG. 1 PRIOR ART
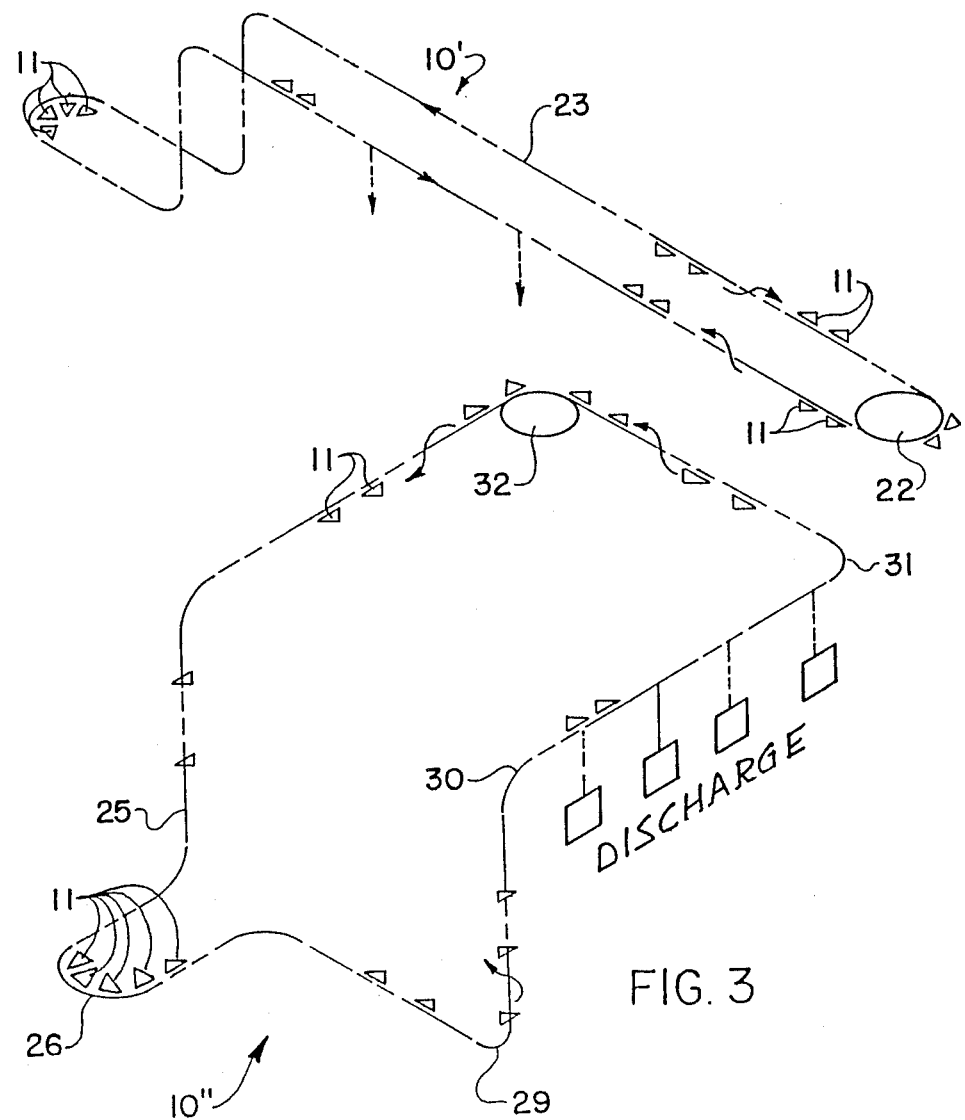
FIG. 2
FIG. 3

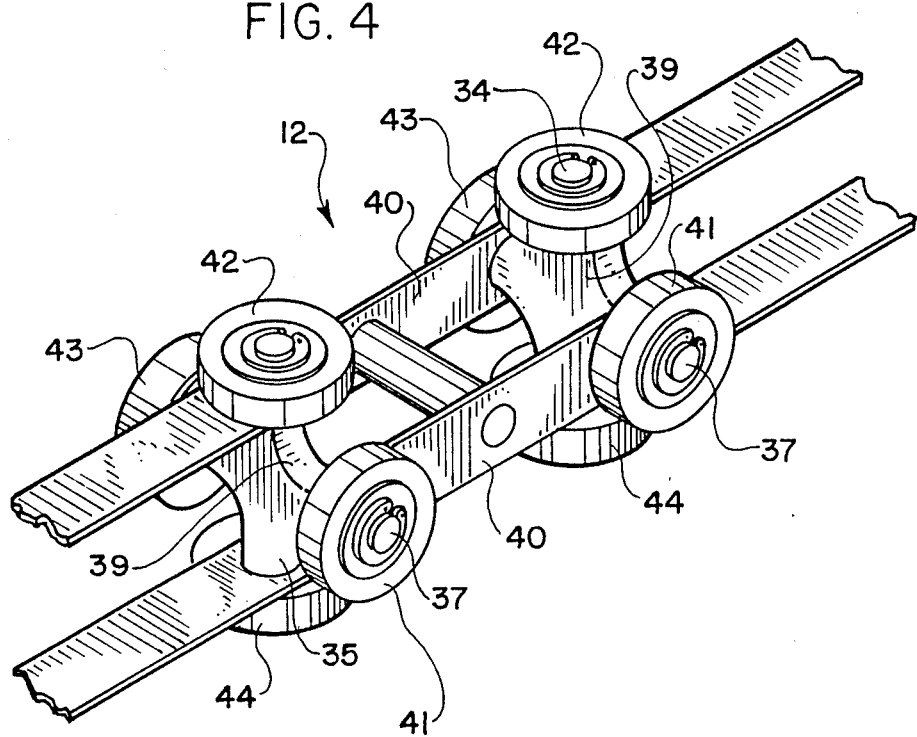
FIG. 4 PRIOR ART
FIG. 4
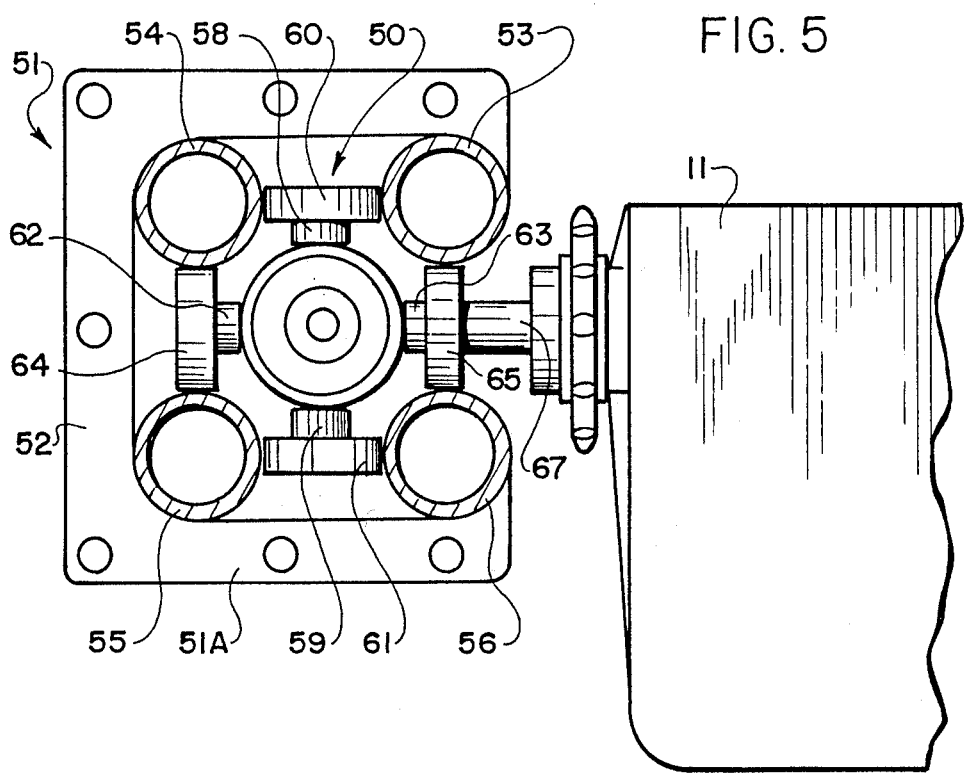
FIG. 5

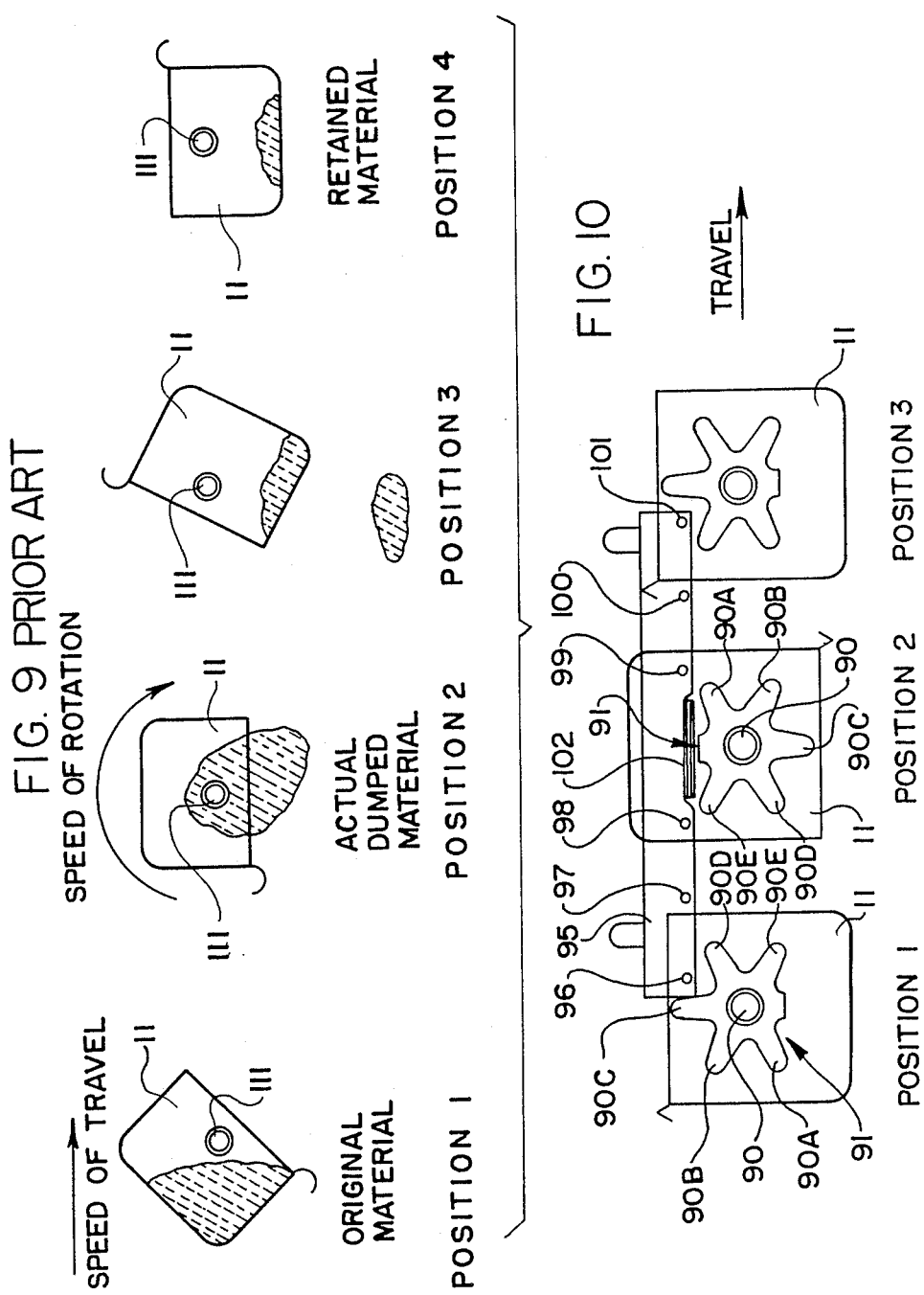

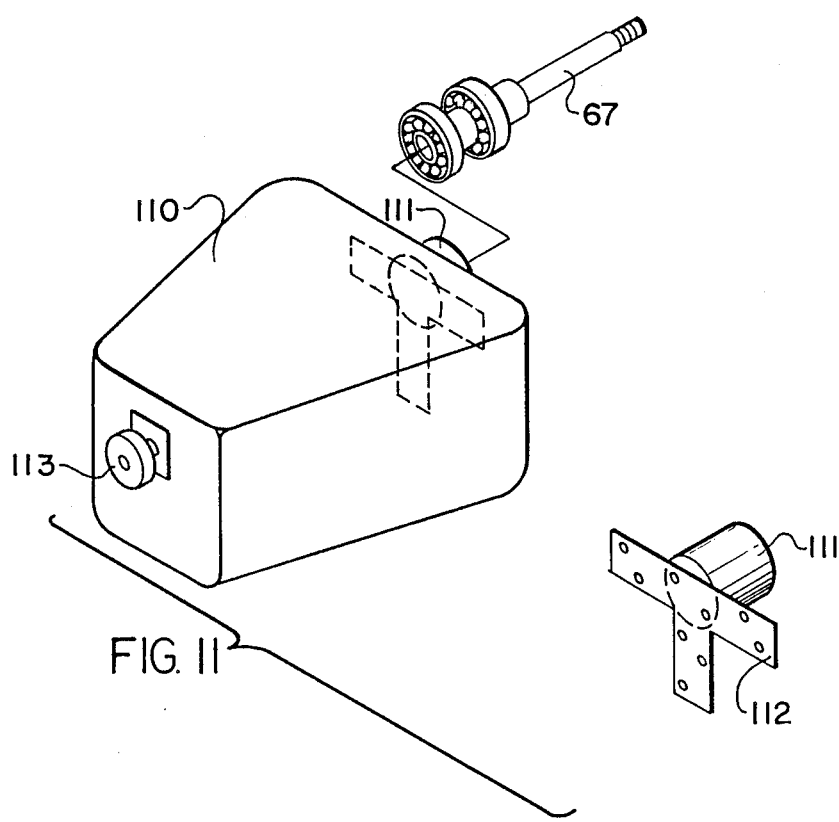
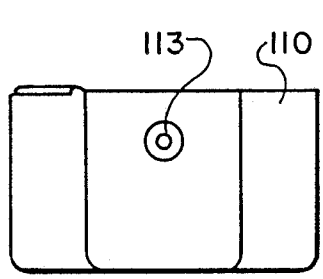
FIG. 12
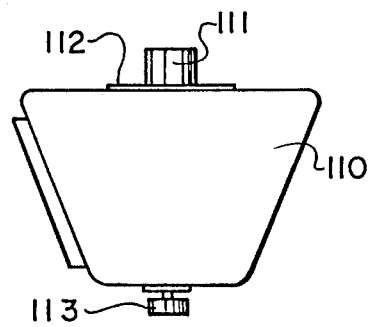
FIG. 13
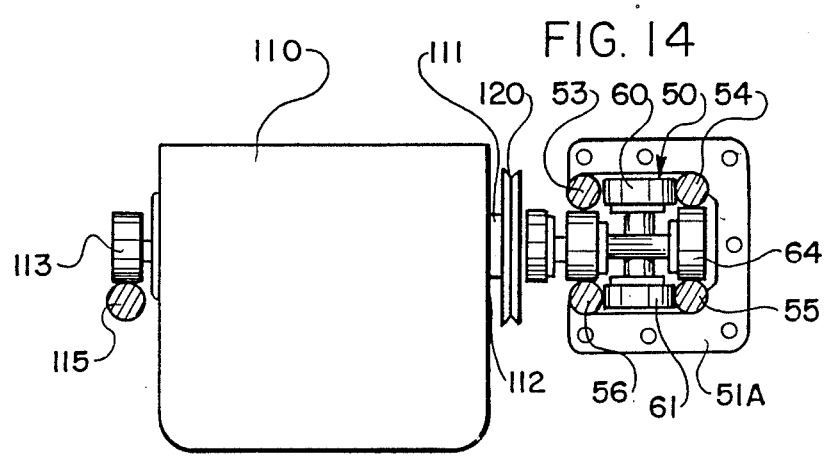

APPARATUS FOR EMPTYING A CONVEYOR BUCKET

TECHNICAL FIELD AND BACKGROUND OF THE INVENTION

This application relates to Ser. Nos. 060,604, 060,478, and 060,501 which are co-pending herewith.

This invention relates to an apparatus for emptying a conveyor bucket. The apparatus is particularly useful when the buckets are traveling at a high rate of speed along the circuit of the conveyor or are carrying heavy loads. In such cases, very high kinetic energy forces are created which cannot be suitably controlled by sprocket-type bucket emptying devices. Positive control of the bucket is necessary at all times.

SUMMARY OF THE INVENTION

Therefore, it is an object of the invention to provide a bucket emptying apparatus which maintains positive control over the bucket during the entire emptying process.

It is another object of the invention to provide a bucket emptying apparatus which utilizes an uniform degree of friction during the emptying process to provide a smooth bucket emptying movement.

These and other objects of the present invention are achieved in the preferred embodiments disclosed below by providing an apparatus for tipping about a horizontal axis a bucket carried by a conveyor chain around a circuit to fill the bucket with contents at a predetermined location and empty the contents thereof at a predetermined location. One of the preferred embodiments preferably comprises a bucket pulley mounted for rotation with the bucket on one end thereof concentric with the horizontal axis about which the bucket is tipped, and a bucket pulley-engaging elongate rack positioned adjacent the chain at a predetermined point on the circuit where the contents of the bucket are to be emptied.

The rack includes an elongate strip mounted thereon having a length at least as long as the circumference of the bucket pulley and frictionally engagable with the circumference of the bucket pulley to rotate the bucket pulley and thereby rotate and invert the bucket mounted thereon as the chain moves the bucket along the length of the rack.

According to another preferred embodiment of the invention, the bucket pulley engaging means comprises first and second drive bucket pulleys spaced along the chain and an endless "V" belt mounted for rotation on the drive bucket pulleys at a predetermined surface speed. Variation of the surface speed of the "V" belt in relation to the surface speed of rotation of the bucket pulley with the "V" belt engages varies the rate at which the bucket is inverted.

According to one preferred embodiment of the invention, the bucket pulley includes a "V" groove in its circumference. The elongate strip has a "V" shaped cross-section for mating frictional engagement with the bucket pulley.

Preferably, the strip is formed of rubber or neoprene.

According to another preferred embodiment of the invention, the rack includes activating means for moving the rack against the bucket pulley when bucket emptying is to be carried out at the location of the rack, and moving the rack away from the bucket pulley when bucket emptying is not to be carried out at the location of the rack.

According to one preferred embodiment of the invention, the elongate strip includes spring loading means mounting the elongate strip to the rack for resistively urging the strip against the bucket pulley to insure proper frictional engagement therebetween.

According to another preferred embodiment of the invention, leveling means level the bucket as it enters the predetermined location for filling the bucket.

Preferably, the leveling means comprises a leveling wheel eccentrically mounted in trailing relation on the bucket pulley and a guide extending along the chain for receiving the leveling wheel and holding the leveling wheel against vertical movement for holding the bucket in a level position while in the filling location. According to another preferred embodiment of the invention, the guide comprises first and second parallel and vertically spaced-apart guide bars for receiving the leveling wheel.

According to yet another embodiment of the invention, the opposing ends of the guide bars are flared outwardly to direct the leveling wheel into the space between the guide bars.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIG. 1 is a schematic perspective view of a conveyor circuit showing a drive arrangement according to the prior art;

FIG. 2 is a schematic perspective view of a conveyor circuit showing bucket rotation before and after passage past a drive tension sprocket;

FIG. 3 is a schematic perspective view of a another conveyor circuit showing bucket rotation of 90 and 180 degrees at different points in the circuit;

FIG. 4 is a fragmentary perspective view of a conveyor chain according to the prior art;

FIG. 5 is a vertical cross-sectional view of a chain, chain track and bucket trolley according to the present invention;

FIG. 9 is a sequence of views illustrating the prior art problem of material retainage when tipping buckets traveling at high speed;

FIG. 10 is a sequence of views illustrating the use of a sprocket with a missing projection for increasing the dwell time of the bucket in its inverted position;

FIG. 11 is an exploded perspective view of a bucket according to the invention having auxiliary support;

FIG. 12 is a side elevation view of the bucket shown in FIG. 11;

FIG. 13 is a top plan view of the bucket shown in FIG. 11;

FIG. 14 is a elevation view, with the track in cross-section, of an embodiment of the invention having auxiliary support for the bucket;

DESCRIPTION OF THE PREFERRED EMBODIMENT

Figure 6:
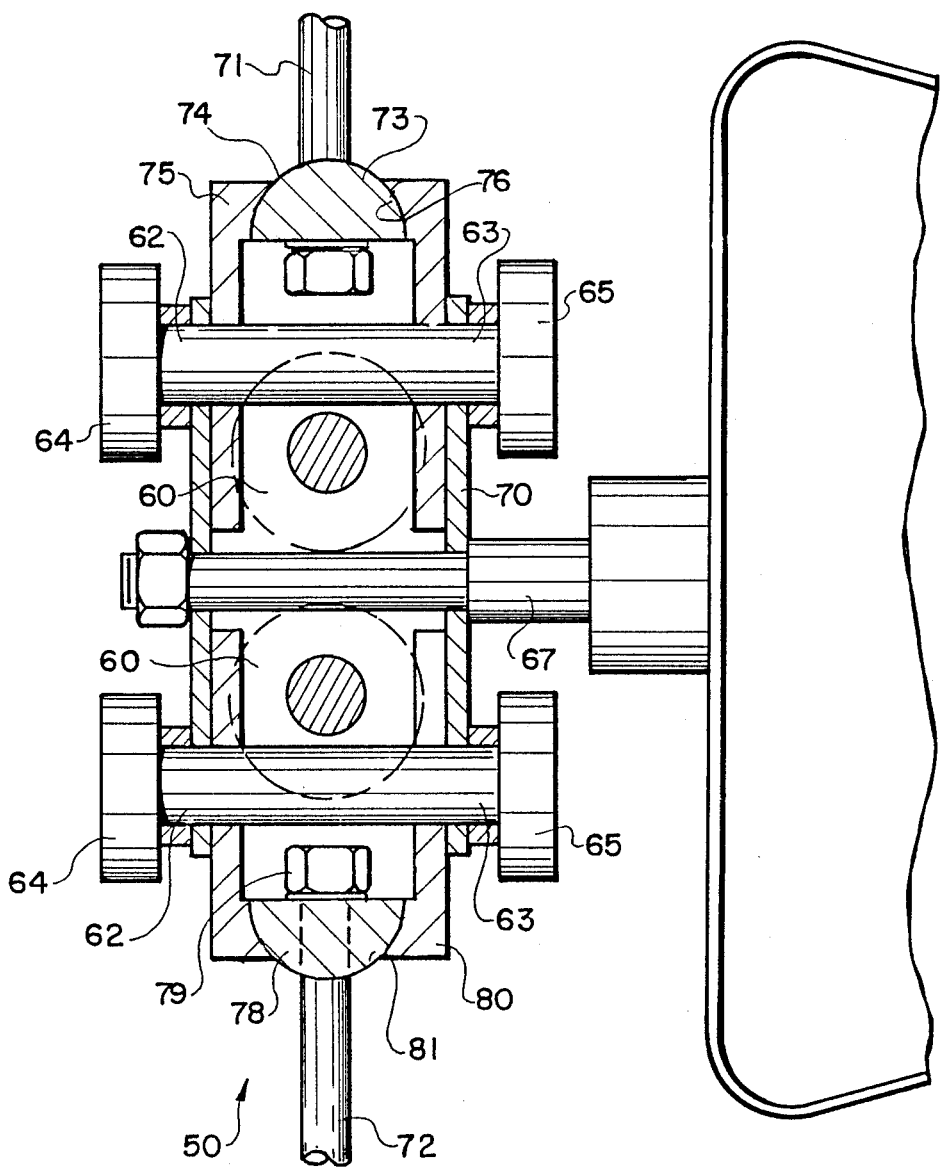
FIG. 6 is a top plan cross-sectional view of the apparatus shown in FIG. 5.

Referring now specifically to the drawings, a conveyor circuit according to the prior art is illustrated in FIG. 1 and indicated broadly at reference numeral 10. As is shown, a plurality of spaced-apart, wedge-shaped buckets 11 are mounted on the inside of a chain 12 which moves around a circuit from a location 13 where the buckets are filled to locations 14, 15 and 16 where the buckets can be selectively emptied by dumping or tipping, as desired. Of course, any desired number of filling and emptying locations can be provided, as is necessary.

The basic features shown in FIG. 1 are the subject of British Pat. Nos. 21643310A and 1139490, owned by this applicant and disclose the basic concept of providing wedge-shaped buckets which, when presented into a specifically designed radius such as the filling station 13 bring the buckets, which are normally free to rotate about a horizontal axis perpendicular to the direction of travel, into juxtaposition with each other with overlapping lips to enable them to be filled without spillage. After filling, the buckets separate to enable them to negotiate the curves and angles of the circuit without colliding with each other.

As is evident from FIG. 1, the buckets 11 must be on the inside of the chain 12 in order to be moved into juxtaposition with each other at the filling location 13. Therefore, sprocket drives 18 and 19 must be positioned on the outside of the chain to avoid interference with the buckets. A tension unit 20 keeps the chain at the proper tension for given load and chain speed conditions.

As is shown in FIG. 2, a more efficient drive tension sprocket 22 operating on the inside of a chain 23 can be used by moving the buckets 11 to the outside of the chain when passage of the buckets past the drive tension sprocket 22 occurs, and then moving the buckets back to the inside of the chain so that they are in the required inside position during passage at the filling location 13.

Another variation is shown in FIG. 3, where the buckets 12 are conveyed around a circuit which includes a chain 25 having both horizontal and vertical right angle bends. For example, on circuit 25 material is loaded into the buckets 12 at a filling location 26. The buckets then travel counterclockwise around a horizontal right angle bend 28 in the usual manner. However, when the buckets reach the vertical right angle bend 29, they must be rotated 90 degrees in order for them to remain upright when they pass over the next right angle bend 30. The buckets negotiate the right angle bend 31 in the usual manner but must be rotated 180 degrees to the outside of the chain 25 before reaching the drive tension sprocket 32. Then after passage around drive tension sprocket 32 the buckets are rotated back to the inside of the chain 25 for movement back to the filling location 26.

The mechanism for performing these functions is described below. First, however, brief reference is made to the chain 12 according to the prior art in FIG. 4. Chain 12, as is shown in FIG. 4, is bi-planar and can only be moved through two fixed planes as the chain pivots around a vertical axis defined by vertically-extending shafts 34 and 35, and horizontally-extending shafts 37 and 38 of a cruciform 39. Cruciforms 39 are connected together by chain members 40 and ride in a chain track formed of four spaced-apart tubes against which ride wheels 41, 42, 43 and 44.

Referring now to FIG. 5, a bucket trolley 50 and chain track 51 according to an embodiment of the invention is shown. Chain track 51 comprises a track plate 52 closed on three sides and supporting four spaced-apart tubes 53, 54, 55 and 56. Bucket trolley 50 comprises vertical wheel shafts 58 and 59 with wheels 60 and 61, respectively, mounted for rotation thereon, and horizontal wheel shafts 62 and 63 with wheels 64 and 65, respectively, mounted for rotation thereon. As is clearly shown in FIG. 5, wheels 60, 61, 64 and 65 ride between tubes 53, 54, 55 and 56 in such a manner as to maintain proper orientation of the trolley 50 with the chain track 51. The bucket 12 is supported on trolley 50 by means of a horizontally-extending spindle 67 on which the bucket is mounted for rotation. This rotation permits the bucket 12 to be tipped for emptying at the appropriate time.

Further details of the trolley 50 are shown in FIG. 6. The wheel shafts 58, 59, 62, and 63 and wheels 60, 61, 64 and 65 described above are carried on a chassis 70 on which is also mounted the spindle 67. Adjacent trolleys 50 are connected together by connecting rods 71 and 72. A semi-spherical end bush 73 is attached to one end of connecting rod 71 by means of nut 74 and is seated in a housing 75 having a spherical seat 76 formed on the inner wall thereof. A semi-spherical end bush 78 is attached to one end of connecting rod 72 by means of nut 79 and is seated in a housing 80 having a spherical seat 81 formed on the inner wall thereof. The trolley 50 is therefore able to rotate about an axis along the length of the chain track 51.

Figure 7:
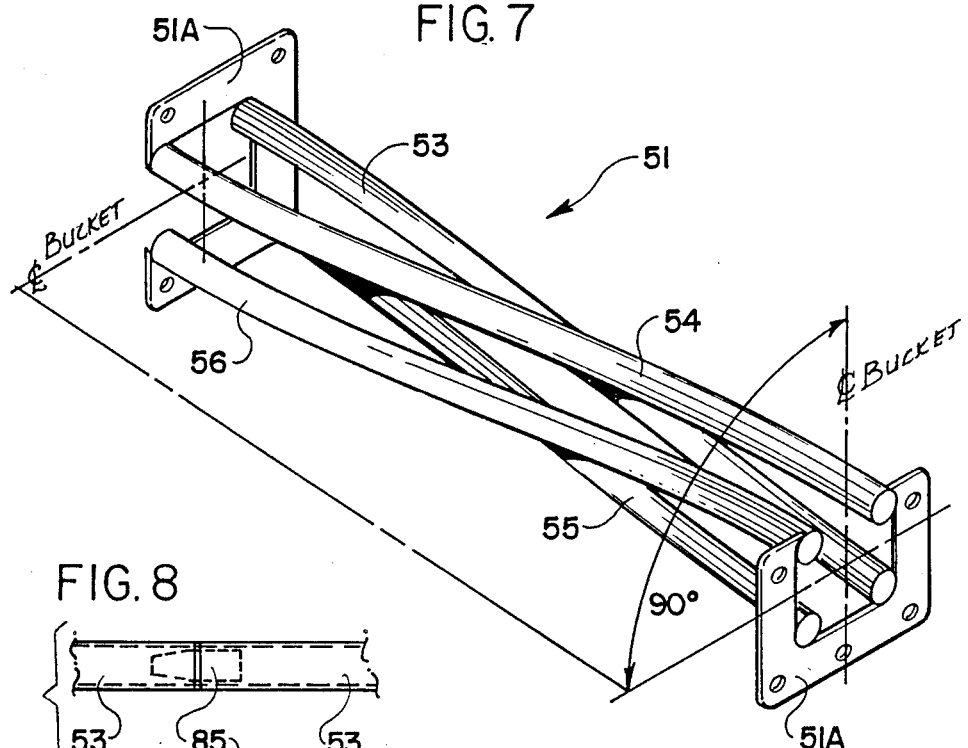
FIG. 7 is a perspective view of a length of chain track according to the present invention.

Referring now to FIG. 7, this is accomplished by forming the tubes 53, 54, 55 and 56 making up chain track 51 into parallel curves which over a predetermined distance have an axis of rotation of, for example, 90 degrees. In the section of chain track 51 shown in FIG. 7, the trolley 50 and the bucket carried on the trolley 50 will be rotated 90 degrees as the trolley moves from one end of the section of chain track 51 to the other. This movement is shown in the environment of the circuit 25 in FIG. 3 and occurs at vertical right angle bend 29.

Figure 8:
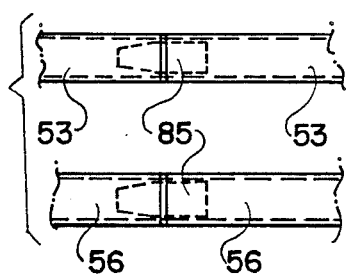
FIG. 8 is a cross-sectional view illustrating a way of joining together adjacent lengths of chain track shown in FIG. 7.

To rotate trolley 50 and bucket 12 180 degrees before and after passage past the drive tension sprocket 32, two sections of the chain track 51 are connected together end-to-end by a flange 51a in each instance. In addition to connecting together the sections of chain track 51 by the flanges 51a, plugs 85 are inserted into the adjacent open ends of the tubes 53, 54, 55, and 56, as is shown in FIG. 8.

The most effective way of dumping contents from a moving bucket is to move the bucket through a complete 360 degree revolution. The speed at which the bucket is inverted is directly proportional to the speed of the chain. For this reason, high speed conveyors rotate the bucket through a 360 degree revolution so fast that products having a relatively light density, for example, food and chemical products of less than 30 pounds per cubic food of density, are not completely emptied from the bucket. This is illustrated in FIG. 9. In position 1, the bucket has begun to invert and the contents are falling towards the mouth of the bucket. In position 2, the bucket is inverted and the contents are free falling out of the mouth of the bucket. However, the bucket is rotating so fast that the trailing edge of the bucket acts as a scoop and retrieves some of the contents before they fall free, as is shown in positions 3 and 4.

This problem can be eliminated by increasing the dwell time of the bucket in the inverted position. The means by which this is done is illustrated in FIG. 10. As is shown, Bucket 12 includes a sprocket 90 mounted on and concentric with spindle 67 on which bucket 12 is mounted. The sprocket 90 is fixed on spindle 67 so that movement of sprocket 90 results in unison movement of bucket 12. In the embodiment shown in FIG. 10, sprocket 90 has five outwardly extending, tapered teeth 90a, 90b, 90c, 90d, and 90e, each 60 degrees apart, thereby forming a star-shaped structure. Of course, sprockets having other numbers and shapes of teeth can also be used as desired. A 120 degree space 91 is defined by the absence of the sixth tooth which would otherwise be present between teeth 90a and 90e. The spindle 76 is positioned sufficiently high so that the center of gravity of the bucket is well below the sprocket 90. Therefore, the weight of bucket 12 will cause the bucket 12 and sprocket 90 to normally assume the position shown in position 1 of FIG. 10.

A rack 95 is mounted adjacent chain track 51 at each position where emptying of the buckets 12 will take place. Usually, only one rack 95 is in position at any one time, and the rack 95 is mounted so that it can be easily put into and out of operation as is necessary to vary the emptying location. Rack 95 has a plurality of laterally outwardly-extending pins 96 through 101 inclusive. Pins 96-101 project into the path of travel of the sprocket 90. As the bucket 12 is carried from position 1 to position 3 in FIG. 10, pin 96 engages tooth 90c and the bucket 12 is tipped counterclockwise. Pin 97 engages tooth 90d and rotates the bucket 12 further. Pin 98 engages tooth 90e and pushes it counterclockwise as the bucket 12 continues to move. At position 2 in FIG. 10, the bucket is completely inverted and contents are free to empty. However, where space 91 is now adjacent rack 95, there is no pin and no tooth to be engaged by the pin. Therefore, bucket 12 does not rotate at the position shown in position 2, but is stationary long enough for the entire contents of the bucket 12 to empty. A nylon block 102 is positioned on the bottom of rack 95 between pins 98 and 99 absorbs the impact of the sprocket 90 and arrests its rotation momentarily. A sufficient distance is left between sprocket 90 and block 102 to permit sprocket 90 to rotate enough in this area for pin 99 to catch tooth 90a and the continue bucket rotation back to its upright position, as is shown in position 3 of FIG. 10.

Details of the design of bucket 12 are shown in FIGS. 11-14. For relatively small buckets, it is sufficient to mount the bucket on one side only. This, of course, is the large side of the bucket adjacent the chain track 51. However, for relatively large buckets and buckets carrying very heavy loads, a bucket as is shown in FIG. 11 is used. Bucket 110 is constructed of a light weight plastic/nylon/polymer material which is also sanitary and easy to clean. A main bucket trunion 111 is welded to a steel support plate 112 which in turn is molded into the wall of bucket 110. Spindle 67 is then positioned in trunion 111.

An auxiliary support wheel 113 (FIG. 12) is mounted on the narrow side of bucket 110 in concentric rotating relation with the axis of spindle 67, as is shown in FIGS. 13 and 14. An auxiliary support track 115 is positioned inboard of chain track 51 and supports wheel 113, as is best shown in FIG. 14.

The support track 115 is tubular and parallels chain track 51. Bucket 110 is therefore supported on opposite sides and is able to carry substantially more weight without fear of damage to either the bucket 110 or the chain or chain track.

Figure 16:
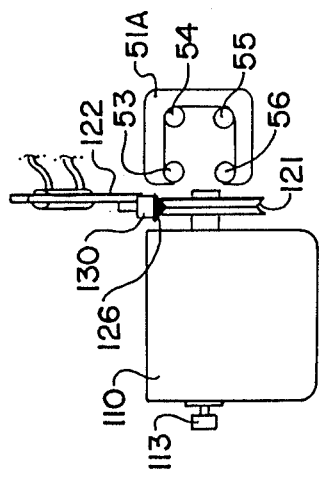
FIG. 16 is a schematic end view of the apparatus shown in FIG. 15.
Figure 15:
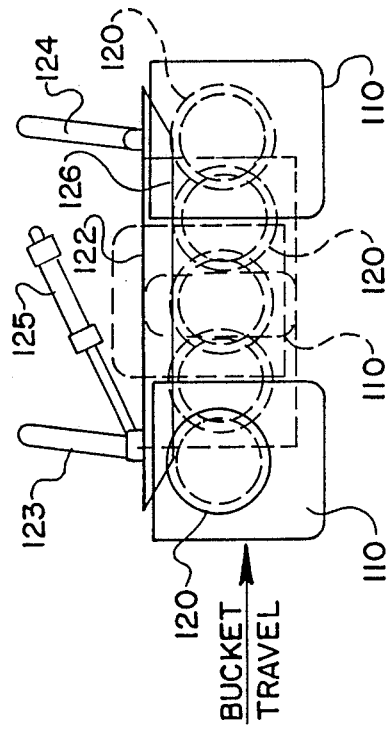
FIG. 15 is a side elevation of one embodiment of the bucket tipping apparatus.
Figure 18:
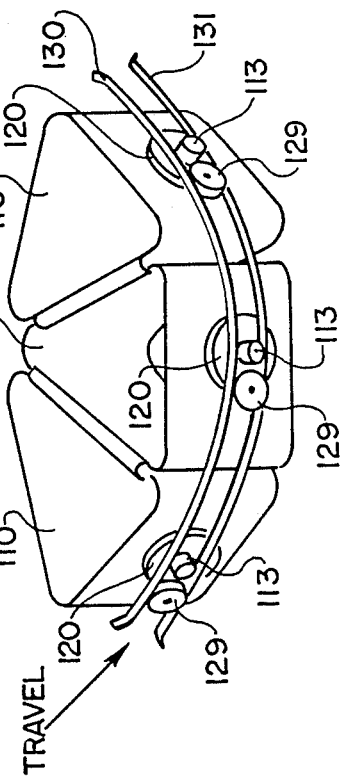
FIG. 18 is a side elevation of another embodiment of a bucket tipping apparatus.

Referring now to FIGS. 15 and 16, another embodiment of a bucket emptying apparatus is shown. The apparatus can be used with either bucket 11 or 110 but will be described below with reference to bucket 110. The sprocket-type of emptying apparatus is unable to effectively control the bucket rotation at speeds greater than about 40 rpm. Therefore, a friction-type of emptying device permits positive control of the bucket 110 throughout its entire 360 degree revolution. A bucket pulley 120 is mounted concentrically with spindle 67 and is fixed to rotate with bucket 110 as it rotates.

Preferably, bucket pulley 120 has a "V" groove 121 around its periphery.

Figure 17:
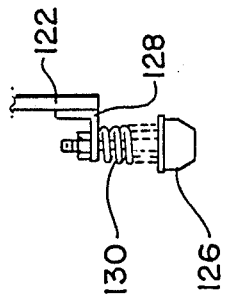
FIG. 17 is a fragmentary enlarged view of the mounting arrangement of the bucket pulley-engaging strip shown in FIG. 16.

A rack 122 is mounted by means of a pair of parallel pivot bars 123, 124 so that it can be moved into and out of operation when desired. Movement of the rack is effectuated by a hydraulic cylinder 125 or some other suitable means. The rack includes a spring-loaded elongate strip 126 which extends along the direction of travel of bucket 110. The strip 126 is preferably fabricated of rubber, neoprene or some other highly durable, heat resistant and friction creating substance. As is best shown in FIG. 17, strip 126 is mounted on rack 122 by means of an angle bracket 128 which carries a spring-loaded assembly 130. The cross-section of strip is essentially that of a truncated "V" and is sized to fit within the "V" groove of bucket pulley 120. The spring-loading insures that good frictional, non-slip contact is achieved between bucket pulley 120 and strip 126.

Referring again to FIG. 15, the sequence of operation is shown. As bucket 110 moves from left to right, strip 126 engages bucket pulley 120. Friction between these two elements causes the bucket pulley to rotate as the bucket continues to move. In so doing, the bucket is likewise caused to rotate, thereby emptying the contents. The strip 126 is the same length as the circumference of the bucket pulley 120 so that when the downstream end of strip 126 has been reached, the bucket pulley has rotated 360 degrees and the bucket 110 has reassumed its upright position.

Figure 19:
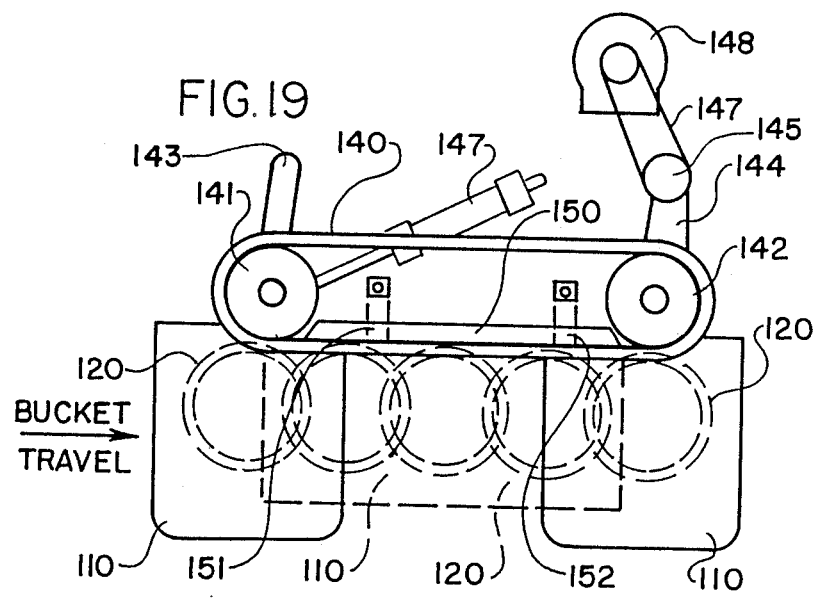
FIG. 19 is a schematic end view of the apparatus shown in FIG. 18.
Figure 20:
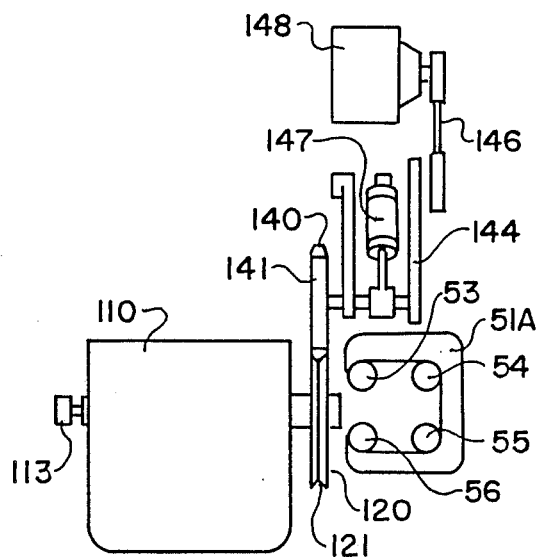
FIG. 20 is a fragmentary enlarged view of the mounting arrangement of the bucket pulley-engaging "V" belt shown in FIG. 18.
Figure 21:
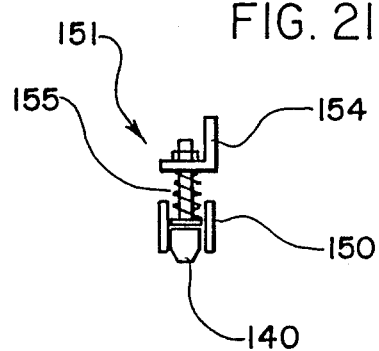
FIG. 21 is a perspective view of the bucket leveling bars according to an embodiment of the invention.

Another apparatus for bucket tipping is shown is FIGS. 19-21. Referring to FIGS. 19 and 20, an endless driven "V" belt 140 is mounted for rotation on two spaced-apart drive pulleys 141, 142. The entire assembly is mounted on pivoting arms 143, 144 so that the "V" belt can be moved into and out of contact with the bucket pulley 120 by activating a cylinder 147. "V" belt is driven by through a secondary drive 145 and a primary drive 146 by a motor 148.

Pressure is maintained between the "V" belt and bucket pulley 120 by a spring-loaded pressure bar 150 which is pressurized by spring assemblies 151 and 152. As is shown in FIG. 21, the spring assemblies 151, 152 are mounted on pressure bar 150 by an angle bracket 154 and are loaded by springs 155.

The speed setting can be adjusted by changing the diameter of the drive pulleys 141, 142 or by using a variable speed motor. These speed changes can produce a change in speed at the point of contact between "V" belt 140 and bucket pulley 120. Increasing the speed of "V" belt slows the revolving speed of bucket 110 and allows more time for the contents to fall free.

As noted earlier, the buckets are filled when in a radius of a size which causes the buckets to move together whereby lips on the buckets are positioned relative to each other in overlapping relation in order to avoid spillage of the product being filled into the buckets. For this to happen, the buckets must be level with each other. This is accomplished by mounting a leveling wheel 129 on the bucket pulley 120 eccentric to and trailing the axis of rotation of bucket pulley 120, as is shown in FIG. 19. An upper guide bar 130 and a lower guide bar 131 are mounted in vertically spaced-apart relation at the filling location. As a bucket 110 moves into the filling position, leveling wheel 129 moves between the guide bars 130 and 131. The guide bars 130, 131 are flared apart slightly at their upstream opening to make sure that the leveling wheel is guided into position to make the transit. Of course, this arrangement can be used wherever bucket leveling is needed.

An apparatus for emptying a conveyor bucket is described above. Various details of the invention may be changed without departing from its scope. Furthermore, the foregoing description of the preferred embodiment according to the present invention is provided for the purpose of illustration only and not for the purpose of limitation—the invention being defined by the claims.

I claim:

1. An apparatus for tipping about a horizontal axis a bucket carried by a conveyor chain around a circuit to fill the bucket with contents at a predetermined location and empty the contents thereof at a predetermined location, comprising:
    (a) a bucket pulley mounted for rotation with the bucket on one end thereof concentric with the horizontal axis about which the bucket is tipped, and
    (b) elongate bucket pulley-engaging means positioned adjacent said chain at a predetermined point on the circuit where the contents of the bucket are to be emptied, said bucket pulley-engaging means having a length at least as long as the circumference of the bucket pulley and frictionally engageable with the circumference of the bucket pulley to rotate the bucket pulley and thereby rotate and invert the bucket mounted thereon as the chain moves the bucket along the length of the bucket pulley-engaging means, said bucket pulley-engaging means comprising first and second drive pulleys spaced along the chain, drive means cooperating with one of said first and second drive pulleys for rotating said drive pulleys and an endless belt mounted for rotation on said drive pulleys at a predetermined surface speed in relation to the surface speed of rotation of the bucket pulley for relative rotational engagement with the bucket pulley to vary the rate at which the bucket is inverted.

2. An apparatus according to claim 1, wherein endless belt comprises a "V" belt.

3. An apparatus according to claim 1 wherein said drive means rotates said endless belt at a predetermined surface speed in the direction of movement of the bucket pulley for decreasing the rate at which the bucket is inverted.

4. An apparatus according to claim 1 wherein said drive means rotates said endless belt at a predetermined surface speed in the direction opposite to the direction of travel of the bucket pulley for increasing the rate at which the bucket is inverted.

* * * * *